(12) United States Patent
Raichle et al.

(10) Patent No.: US 9,496,810 B2
(45) Date of Patent: Nov. 15, 2016

(54) METHOD AND APPARATUS FOR CONTROLLING AN ELECTRIC MACHINE

(75) Inventors: Daniel Raichle, Valhingen (DE); Markus Merten, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 206 days.

(21) Appl. No.: 14/357,448

(22) PCT Filed: Sep. 13, 2012

(86) PCT No.: PCT/EP2012/067967
§ 371 (c)(1),
(2), (4) Date: Jul. 18, 2014

(87) PCT Pub. No.: WO2013/068158
PCT Pub. Date: May 16, 2013

(65) Prior Publication Data
US 2014/0361719 A1  Dec. 11, 2014

(30) Foreign Application Priority Data
Nov. 10, 2011 (DE) .................. 10 2011 086 079

(51) Int. Cl.
*H02P 6/18* (2016.01)
*G01M 17/00* (2006.01)
(Continued)

(52) U.S. Cl.
CPC ............. *H02P 6/18* (2013.01); *B60L 3/0061* (2013.01); *B60L 3/04* (2013.01); *B60L 7/003* (2013.01);
(Continued)

(58) Field of Classification Search
CPC .......... H02P 6/18; H02P 6/002; H02P 27/06; B60L 3/0061; B60L 11/1803; B60L 15/007; B60L 15/12; B60L 11/14; B60L 2210/42; B60L 2240/429; B60L 2240/529; B60L 3/04; B60L 7/003
See application file for complete search history.

(56) References Cited

U.S. PATENT DOCUMENTS 6,324,038 B1  11/2001  Kishibe et al.
6,378,636 B1  4/2002  Worrel
(Continued)

FOREIGN PATENT DOCUMENTS

DE  102011006516  10/2012
EP  2322374  5/2011

OTHER PUBLICATIONS

International Search Report for Application No. PCT/EP2012/067967 dated Jun. 28, 2013 (English Translation, 2 pages).

*Primary Examiner* — Bentsu Ro
*Assistant Examiner* — Zemenay Truneh
(74) *Attorney, Agent, or Firm* — Michael Best & Friedrich LLP

(57) ABSTRACT

The invention relates to a method for controlling an electrical machine (10) by means of an inverter (12), in particular for use in a motor vehicle, wherein the inverter (12) has a plurality of controllable circuit breakers (14) which are designed to convert a DC voltage from a voltage source (22), which is coupled to the circuit breakers (14), into an AC voltage for supplying electrical energy to the electrical machine (10), wherein the electrical machine (10) is then switched to a freewheeling mode (32) by opening all the circuit breakers (14) of the inverter (12), wherein a phase current of the electrical machine (10) is detected, wherein the electrical machine (10) is switched from the freewheeling mode (32) to a short-circuit mode (36) as a function of a comparison (34) of the phase current, or of a first variable which is derived from the phrase current, with a first reference value, wherein the circuit breakers (14) which are associated with a first potential of the voltage source (22) are closed in the short-circuit mode (32) and wherein the circuit breakers (14) which are associated with a second potential of the voltage source (22) are opened, and wherein the electrical machine (10) is switched from the short-circuit mode (36) to the freewheeling mode (32) as a function of a comparison (38) of the phrase current, or of a second variable which is derived from the phrase current, with a second reference value.

9 Claims, 2 Drawing Sheets

(51) Int. Cl.
  *B60L 3/00* (2006.01)
  *B60L 3/04* (2006.01)
  *B60L 7/00* (2006.01)
  *B60L 11/18* (2006.01)
  *B60L 15/00* (2006.01)
  *B60L 15/12* (2006.01)
  *B60L 11/14* (2006.01)
  *H02P 27/06* (2006.01)
  *H02P 29/02* (2016.01)

(52) U.S. Cl.
  CPC ............ *B60L 11/14* (2013.01); *B60L 11/1803* (2013.01); *B60L 15/007* (2013.01); *B60L 15/12* (2013.01); *H02P 6/28* (2016.02); *H02P 27/06* (2013.01); *B60L 2210/42* (2013.01); *B60L 2240/421* (2013.01); *B60L 2240/429* (2013.01); *B60L 2240/529* (2013.01); *B60L 2260/24* (2013.01); *H02P 29/02* (2013.01); *Y02T 10/645* (2013.01); *Y02T 10/70* (2013.01); *Y02T 10/7005* (2013.01); *Y02T 10/7077* (2013.01); *Y02T 10/7241* (2013.01)

(56) References Cited

U.S. PATENT DOCUMENTS

| | | | |
|---|---|---|---|
| 2007/0194734 A1* | 8/2007 | Weinmann | H02P 6/182 318/400.31 |
| 2009/0066271 A1 | 3/2009 | Kajouke et al. | |
| 2009/0179608 A1 | 7/2009 | Welchko et al. | |
| 2013/0041554 A1* | 2/2013 | Trunk | B60L 3/0061 701/34.1 |

\* cited by examiner

METHOD AND APPARATUS FOR CONTROLLING AN ELECTRIC MACHINE

BACKGROUND OF THE INVENTION

The present invention relates to a method for controlling an electric machine by means of an inverter, in particular for use in a motor vehicle, wherein the inverter has a plurality of controllable power switches which are designed to convert a direct voltage of a voltage source, coupled to the power switches, into an alternating voltage for supplying the electric machine with electrical energy.

In addition, the present invention relates to an apparatus for actuating an electric machine by means of an inverter, in particular for use in a motor vehicle, wherein the inverter has a plurality of controllable power switches which are designed to convert a direct voltage of a voltage source, coupled to the power switches, into an alternating voltage for supplying the electric machine with electrical energy, having a control unit for controlling the inverter.

In addition, the present invention relates to a motor vehicle drive train having an electric machine for making available drive power and having an apparatus for controlling the electric machine of the type described above.

In the field of motor vehicle drive technology it is generally known to use an electric machine as the single driver or together with the drive motor of a different type (hybrid drive). Hybrid drives are typically comprised of a combination of an internal combustion engine and at least one electric machine as well as the associated energy accumulators in the form of fuel tanks and a battery. There are different types of hybrid drives, wherein two basic structures are differentiated, specifically serial and parallel hybrid drives. A combination of the two structures is also referred to as a power-split hybrid drive.

The serial hybrid drive is distinguished by a series connection of energy converters. This requires, for example, two electric machines and an internal combustion engine. One of the electric machines is operated as a generator and the other electric machine is operated as a motor. The internal combustion engine itself is not connected to a drive train of the motor vehicle. It charges the battery via the electric machine which is operated as a generator and/or directly makes available the required electrical energy to the electric machine which is operated as a motor. The power which is necessary to drive the motor vehicle is therefore transmitted exclusively from the electric machine which is operated as a motor to the drive train.

The parallel hybrid drive is distinguished by the fact that both the electric machine and an electric machine can pass on their respective mechanical power to a drive train. By means of a mechanical coupling of the two machines to the drive train their respective power can be added. The possibility of adding power in this way permits the two machines to be given relatively small dimensions without disadvantages occurring in respect of driving performance for the motor vehicle.

There are different types of implementing parallel hybrid drives. One possibility is to connect the electric drive directly to a crankshaft of the internal combustion engine (crankshaft-starter generator) or to connect it to the internal combustion engine by means of a belt drive. Both drive machines can therefore be used jointly or individually for propelling the motor vehicle. The electric machine can additionally optionally be operated as a generator or as a motor. The power-split hybrid drive is distinguished by a combination of the principles which have already been presented. The use of a power-split transmission (planetary transmission) permits part of the power of the internal combustion engine to be passed on directly, i.e. mechanically, to the drive train, while the remaining part of the power is converted into electrical energy via a generator. This electrical energy can in turn optionally be stored in a battery or passed on directly to an electric machine arranged downstream of the transmission. In the case of a power-split hybrid drive, both the electric machine and the internal combustion engine are used for propelling the motor vehicle.

Power electronics are typically used to control electric machines in a motor vehicle and, in particular, in a hybrid drive. These power electronics have an inverter which converts a direct voltage/direct current of the (high-voltage) battery located on board the motor vehicle into an alternating current. The power electronics conduct a high voltage of typically 60 volts.

Inverters have a series of power switches with which the individual phases (U, V, W) of the electric machine are optionally connected to a high potential, referred to as the intermediate circuit voltage, or to a low reference potential, in particular ground. Alternating voltages are therefore made available at the three phases of the electric machine by using the power switches. The power switches are controlled by a control unit which calculates a setpoint operating point for the electric machine as a function of the driver's request (accelerating or braking).

In a fault state or standby state/state of rest, the inverter cannot output any energy of the rotating electric machine into a direct voltage part of the system. The inverter is therefore switched into a safe state in order to prevent damage to electrical components. Essentially three different switch-off methods or operating modes are know from the prior art. In a short-circuit mode, all the switches which are connected to the load potential are closed and all the switches which are connected to the high potential are opened. In the other operating mode, referred to as open-circuit mode, all the switches of the inverter are opened.

In the case of a rotating electric machine, an alternating voltage is induced in the three phase sections of the electric machine. In the short-circuit mode, an alternating current flows in the phase sections of the machine via the closed path, which is owing to the induced alternating voltage. This gives rise to a sudden change in the machine torque, which can have a disruptive effect on the behavior of the vehicle. In the open-circuit mode, an alternating voltage is also induced. The level of the alternating voltage is dependent on the machine characteristic and the rotational speed of the electric machine. If the alternating voltage is higher than the intermediate circuit voltage, a current flows into the direct voltage part of the circuit. Since energy is transferred into this part, energy accumulators and other electrical components can be overloaded or damaged.

Since neither a sudden change in the machine torque nor a flow of current into the direct voltage part of the circuit is desired, it is known to switch either into the short-circuit mode or into the open-circuit mode as a function of the rotational speed, the machine characteristic and the level of the intermediate circuit voltage. However, the calculations for switching over between these two operating modes, which are carried out on the basis of the machine characteristic and the information from a rotational speed sensor system, are complex. Furthermore, the installation of the rotational speed sensor system on an electric machine entails additional costs.

SUMMARY OF THE INVENTION

The present invention therefore makes available a method for controlling an electric machine by means of an inverter, in particular for use in a motor vehicle, wherein the inverter has a plurality of controllable power switches which are designed to convert a direct voltage of a voltage source, coupled to the power switches, into an alternating voltage for supplying the electrical machine with electrical energy, wherein the electric machine is firstly switched into an open-circuit mode by opening all the power switches of the inverter, wherein a phase current of the electric machine is detected, wherein the electric machine is switched from the open-circuit mode into a short-circuit mode as a function of a comparison of the phase current or of a first variable, which is derived from the first current, with a first reference value, in the short-circuit mode the power switches which are assigned to a first potential of the voltage source are closed, and wherein the power switches which are assigned to a second potential of the voltage source are opened, and wherein the electric machine is switched from the short-circuit mode into the open-circuit mode as a function of a comparison of the phase current or of a second variable, which is derived from the phase current, with a second reference value.

In addition, the invention makes available an apparatus for controlling an electric machine by means of an inverter, in particular for use in a motor vehicle, wherein the inverter has a plurality of controllable power switches which are designed to convert a direct voltage of a voltage source, coupled to the power switches, into an alternating voltage for supplying the electric machine with electrical energy, having a control unit which controls the inverter and which is designed to carry out the method of the type specified above.

Finally, the present invention makes available a motor vehicle drive train having an electric machine for making available drive power and having an apparatus for controlling the electric machine of the type specified above.

By virtue of the present invention, it is possible to change over between a short-circuit mode and an open-circuit mode as a function of the profile of the phase currents in the phase sections of the electric machine. Complex calculations based on the machine characteristic and the measured values from a rotational speed sensor system are not necessary. In order to set the correct operating mode it is possible to use the directly measured phase currents. Furthermore, in the case of electric vehicles it is advantageous for the safety if switching over between the open-circuit mode and the short-circuit mode is implemented in a hardware circuit. However, in a hardware circuit it is costly to carry out evaluation of rotational speeds. Furthermore the coupling to the hardware circuit is made difficult by the diversity of rotational speed sensor systems. The present invention solves this problem, since the switching over between the two operating modes takes place as a function of the profile of the phase currents.

It is particularly preferred if the first variable, which is derived from the phase current, is an absolute value of the phase current, wherein the electric machine is switched from the open-circuit mode into the short-circuit mode if the absolute value of the phase current exceeds the first reference value.

If the absolute value of the phase current exceeds the first reference value in the open-circuit mode, the rotational speed of the electric machine is so high that current, and therefore energy, flows into the direct voltage part of the system and therefore a torque is also produced at the machine shaft. Energy accumulators in the direct voltage part can be overloaded and therefore damaged permanently. On the basis of this comparison with the first reference value it is therefore possible to switch from the open-circuit mode into the short-circuit mode.

According to a further preferred embodiment, the second variable, which is derived from the phase current, is a frequency of the phase current, wherein the electric machine is switched from the short-circuit mode into the open-circuit mode if the frequency of phase current undershoots the second reference value.

The frequency of the phase current is proportional to the rotational speed of the electric machine. If the frequency is below the second reference value, it is possible to switch into the open-circuit mode again since at a low frequency of the phase current it is ensured that the induced voltage in the subsequent open-circuit mode is so low that no current, and therefore no energy, flows into the direct voltage part.

According to a further embodiment, at least one further phase current is detected, wherein the switching over of the electric machine from the open-circuit mode into the short-circuit mode takes place as a function of a comparison of the further phase current or of a first variable, which is derived from the further phase current, with a further first reference value.

By means of the further detected phase current and the additional comparison, the switching over of the electric machine from the open-circuit mode into the short-circuit mode can be carried out even more reliably.

In a further embodiment, the further first reference value has the same value as the first reference value.

Since the electric machine is of substantially symmetrical design with respect to its windings, the comparisons of the phase current and of the further phase current can therefore be simplified.

Furthermore, it is preferred if the switching over of the electric machine from the short-circuit mode into the open-circuit mode takes place as a function of the comparison of the further phase current or of a second variable, which is derived from the further phase current, with a further second reference value.

Combining the comparisons of the phase current and of the further phase current permits the electric machine to be switched more safely and reliably from the short-circuit mode into the open-circuit mode.

According to a further embodiment, the further second reference value has the same value as the second reference value.

This measure simplifies, and therefore speeds up, the comparisons which are to be carried out.

Of course, the features which are mentioned above and which are still to be explained below can be used not only in the respectively specified combination but also in other combinations or alone, without departing from the scope of the invention.

BRIEF DESCRIPTION OF THE DRAWINGS

Exemplary embodiments of the invention are illustrated in the drawing and will be explained in more detail in the following description.

In the drawing.

DETAILED DESCRIPTION

Figure 1:
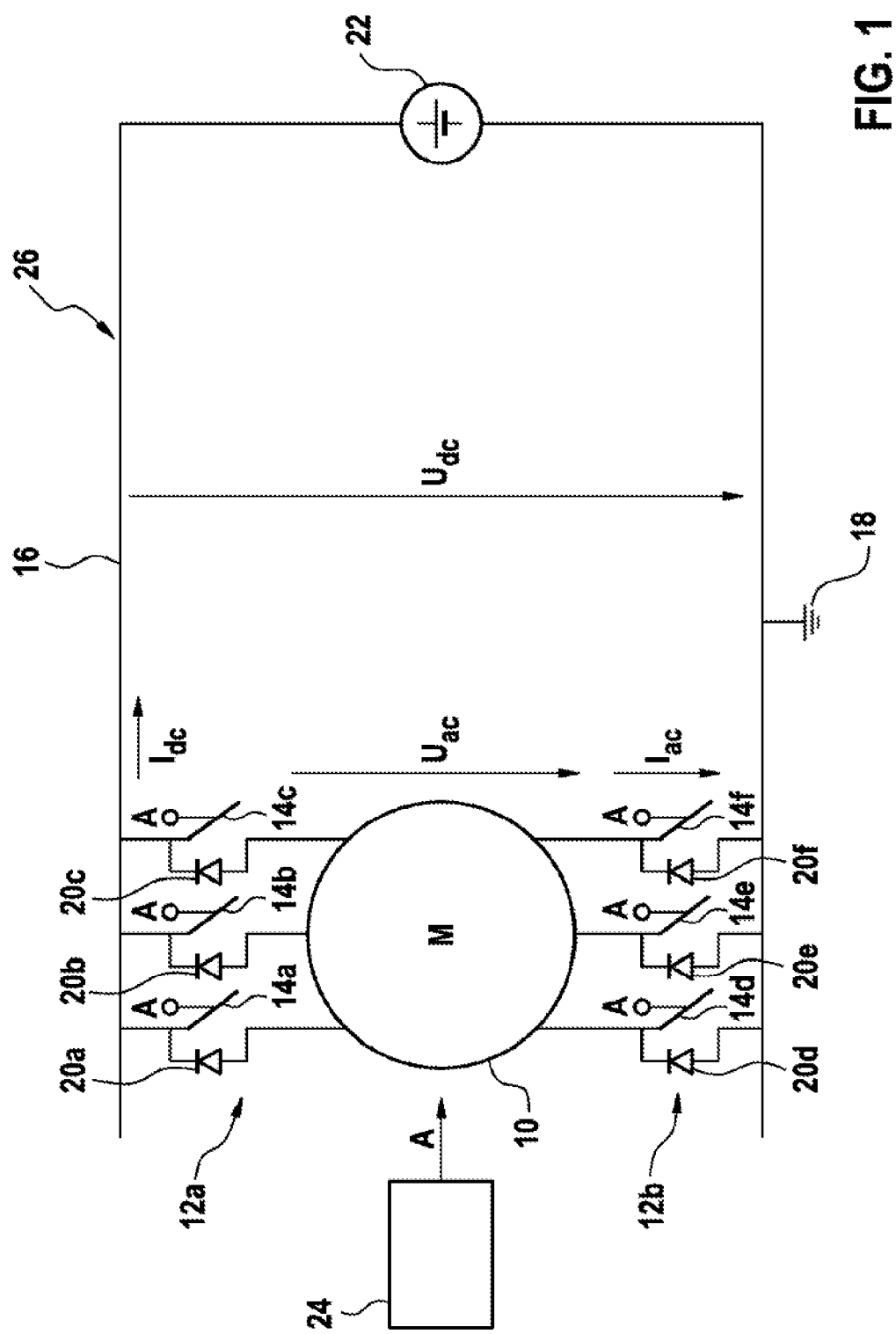
FIG. 1 is a schematic illustration of a three-phase electric machine with an inverter.

FIG. 1 shows a schematic illustration of an electric machine 10 having an inverter 12 which is connected thereto. The inverter 12 has a plurality of power switches 14a to 14f which are connected to the individual phases U, V, W of the electric machine 10 and which switch the phases U, V, W either to a high supply potential 16 or to a low reference potential (ground) 18. The difference in potential between the high supply potential 16 and the low supply potential 18 forms a direct voltage U_dc, referred to as the intermediate circuit voltage. The direct voltage U_dc is made available by a voltage source 22 or a battery 22. Furthermore, the inverter 12 has a plurality of free-wheeling diodes 20a to 20f which are each arranged parallel to the power switches 14a to 14f.

The inverter 12 determines the power and operating mode of the electric machine 10 and is controlled accordingly by a control unit 24. For this purpose, an output A of the control unit 24 is electrically coupled to the power switches 14a to 14f. The electric machine 10 can thus be optionally operated either in the motor mode or in the generator mode. In the motor mode, the electric machine 10 assists, for example, an internal combustion engine with an additional drive torque. In the generator mode, mechanical energy is converted, for example during a braking process, into electrical energy and is stored in an energy accumulator, in this case in the battery 22.

In the event of a fault, which can arise, for example, owing to an excessively high battery current or an excessively high feed current, the inverter 12 is switched into a safe state in order to prevent possible damage to electrical components or overloading of the battery 22. For this purpose, in principle two different operating modes are available. In the first operating mode, referred to as the short-circuit mode, the power switches 14d to 14f which are coupled to the low supply potential 18 are closed, and the power switches 14a to 14c which are coupled to the high supply potential 16 are opened. If a rotor rotates in a stator of the electric machine 10, an alternating voltage U_ac is induced in the phase sections of the electric machine 10. An alternating current I_ac flows in the three-phase sections of the electric machine 10 via the closed power switches 14d to 14f as a result of the induced voltage U_ac. Owing to the alternating current I_ac, a short-circuit torque is induced at a shaft of the electric machine 10. However, no current or no energy is conducted into the direct voltage part 26 of the circuit arrangement from FIG. 1.

In an alternative embodiment of the short-circuit mode of the electric machine 10, the power switches 14d to 14f can be opened and the power switches 14a to 14c can be closed.

In the second operating mode, referred to as the open-circuit mode, all the power switches 14a to 14f of the inverter 12 are opened. In the open-circuit mode, an alternating voltage U_ac is also induced. The level of the alternating voltage U-ac is dependent on the machine characteristic and the rotational speed of the electric machine 10. If the alternating voltage U_ac is higher than the direct voltage U_dc, a current I_dc flows into the direct voltage part 26 via the free-wheeling diodes 20a to 20f. As a result, energy is also transferred into the direct voltage part 26. There is the risk of the battery 22 and other electrical components being overloaded or damaged. If the induced alternating voltage U_ac in the open-circuit mode is lower than the direct voltage U_dc, torque is not generated at the shaft of the electric machine 10 and a current I_dc does not flow into the direct voltage part 26. Since neither a sudden change in the torque at the shaft of the electric machine 10 nor a current I_dc or an energy transferred into the direct voltage part 26 is desired, according to the invention switching over occurs either into the short-circuit mode or into the open-circuit mode as a function of the profile of the phase current I_ac.

Figure 2:
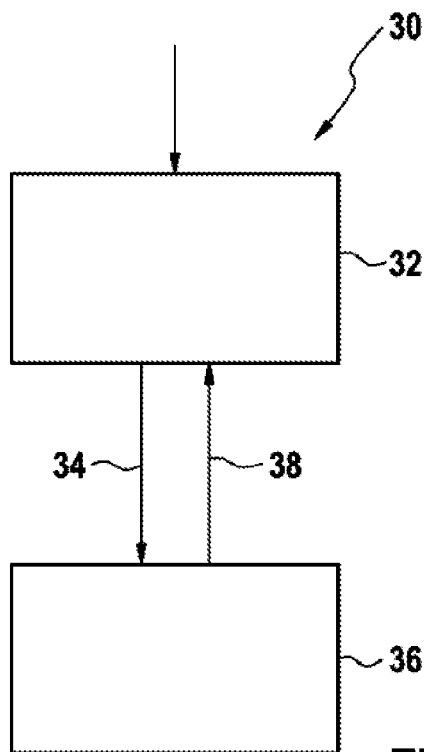
FIG. 2 shows a state diagram of various operating states of an electric machine in the case of a fault.

FIG. 2 shows a state diagram 30 of various operating states of the electric machine 10 in the event of a fault.

When a fault occurs, the electric machine 10 is firstly switched into a first operating state 32, the open-circuit mode 32. In the open-circuit mode 32, all the power switches 14a to 14f are opened. As a result of the rotating rotor of the electric machine 10, the voltage U_ac is induced in the phase sections of the electric machine 10. The alternating voltage U_ac results in the alternating current I_ac. If the induced voltage U_ac exceeds the direct voltage U_dc, the rectified current I_dc flows via the free-wheeling diodes 20a to 20f. Therefore, if the absolute value of the induced alternating current I_ac exceeds a first reference value, the rotational speed of the electric machine 10 is so high that the current I_dc, and therefore energy, flows into the direct voltage part 26. Furthermore, as a result of the high induced voltage U_ac and the resulting current I_ac, a high braking torque is produced at the machine shaft of the electric machine 10. By means of a comparison 34, in which the absolute value of the phase current I_ac is compared with the first reference value, it is decided whether the electric machine 10 is switched from the open-circuit mode 32 into a second operating state 36, the short-circuit mode 36. The first reference value is selected here in such a way that no energy is transferred into the direct voltage part 26 if the absolute values of the phase current I_ac undershoot the first reference value. If the absolute value of the phase current I_ac exceeds the first reference value, the short-circuit mode 36 is set at the electric machine 10 via the power switches 14a to 14f. In the present example, in the short-circuit mode 36 the power switches 14a to 14c are opened and the power switches 14d to 14f are closed. Alternatively, the power switches 14a to 14c can be closed and the power switches 14d to 14f can be opened. The alternating voltage U_ac is also induced in the short-circuit mode 36. The alternating current I_ac flows via the closed power switches 14d to 14f. As a result, a short-circuit torque is produced at the shaft of the electric machine 10, but said short-circuit torque is smaller than the braking torque in the previous open-circuit mode 32. Furthermore, the direct current I_dc is not conducted into the direct circuit part 26. As a result, there is no risk of the battery 22 or other electrical components being overloaded or damaged.

Figure 3:
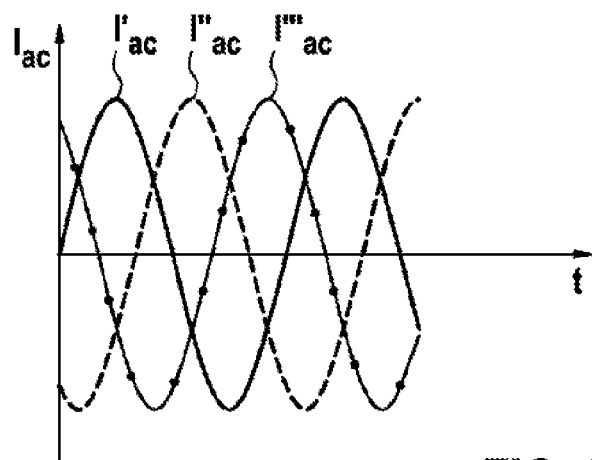
FIG. 3 shows an exemplary illustration of the three-phase currents in the three-phase sections of the electric machine.

As soon as the rotational speed of the electric machine 10 had dropped to a predefined threshold, switching over from the short-circuit mode 36 back into the open-circuit mode 32 occurs. For this purpose, the frequency of the phase currents I_ac in the phase sections of the electric machine 10 is measured. FIG. 3 shows an exemplary profile of the three phase currents I_ac', I_ac'' and I_ac''' which flow in the three phase sections of the electric machine 10 via the closed power switches 14d to 14f in the short-circuit mode 36 and a rotating electric machine 10. As is apparent from FIG. 3, the three phase currents I_ac are each phase-shifted by 120° with respect to one another.

In the present example, the frequency is now determined by one of the phase currents I_ac. The frequency of the phase current I_ac is proportional to the rotational speed of the electric machine 10. If the frequency of the phase current I_ac, and therefore the rotational speed of the electric machine 10, is below a second reference value, the electric machine 10 is switched into the open-circuit mode 32. In the case of a low frequency of the phase current I_ac in the short-circuit mode 36, it is ensured that in the case of subsequent switching into the open-circuit mode 32, the voltage U_ac which is induced as a result is so low that no current I_dc flows into the direct voltage part 26 of the system, that is to say the induced voltage U_ac is lower than the direct voltage U_dc. The second reference voltage is dimensioned on the basis of this threshold. No torque is generated at the shaft of the electric machine 10. The battery 22 or else other electrical components cannot be overloaded or damaged. As a result, the switching over from the short-circuit mode 36 into the open-circuit mode 32 takes place as a function of a comparison 38 in which the frequency of the phase current I_ac is compared with the second reference value.

The switching over between the two operating modes (open-circuit mode 32, short-circuit mode 36) takes place as a function of the profile of the phase current I_ac. As a result, complex calculations on the basis of the machine characteristic of the electric machine 10 can be eliminated. Furthermore, it is not necessary to provide a rotational speed sensor system.

In a further embodiment (not shown) of the method, a plurality of phase currents I_ac can also be detected. The absolute values or frequencies of these further phase currents I_ac are then compared with further reference values according to the comparisons 34, 38 mentioned above. The further reference values can have the same values as the first and second reference values, respectively. The electric machine 10 here can be switched from the open-circuit mode 32 into the short-circuit mode 36 if at least the absolute value of a phase current I_ac exceeds the first reference value. Alternatively, this switching over can take place if the absolute values of two phase currents I_ac, or of all the phase currents I_ac, exceed the first reference value. Analogously, the switching over of the electric machine 10 from the short-circuit mode 36 into the open-circuit mode 32 can take place if at least the frequency of a phase current I_ac undershoots the second reference value. Alternatively, the switching over can take place if the frequencies of two, or of all the phase currents I_ac, undershoot the second reference value.

Although preferred embodiments of the method according to the invention have therefore been presented, various refinements and modifications can of course be performed.

For example, in the case of the comparison 34 a different number of phase currents I_ac than in the case of the comparison 38 can be taken into account.

Furthermore, the first reference value for the comparisons with different phase currents I_ac can have the same value or different values. This applies analogously to the second reference value.

The method according to the invention can be implemented using either software or hardware. The implementation using hardware makes it possible to switch over quickly between the two operating modes 32 and 36. The method according to the invention permits switching over between these two operating modes 32, 36 by evaluating the phase current characteristic. The complex rotational speed sensor system which is arranged on the electric machine 10 is therefore not required. This facilitates implementation of the switching over of the operating mode in a hardware circuit, since the hardware circuit does not have to be adapted to various rotational speed sensor systems.

The invention claimed is:

1. A method for controlling an electric machine by means of an inverter, wherein the inverter has a plurality of controllable power switches which are configured to convert a direct voltage of a voltage source, coupled to the plurality of controllable power switches, into an alternating voltage for supplying the electric machine with electrical energy, the method comprising:
    switching, by a control unit, the electric machine into an open-circuit mode, wherein in the open-circuit mode all of the plurality of controllable power switches of the inverter are opened;
    detecting a phase current of the electric machine;
    comparing one of the phase current or a first variable derived from the phase current to a first reference value;
    switching over, by the control unit, the electric machine from the open-circuit mode into a short-circuit mode based on the comparison of the one of the phase current or the first variable derived from the phase current to the first reference value, wherein in the short-circuit mode a portion of the plurality of controllable power switches that are assigned to a first potential of the voltage source are closed, and wherein a second portion of the plurality of controllable power switches that are assigned to a second potential of the voltage source are opened;
    comparing one of the phase current or a second variable derived from the phase current to a second reference value; and
    switching over, by the control unit, the electric machine from the short-circuit mode into the open-circuit mode based on the comparison of the one of the phase current or the second variable derived from the phase current to the second reference value.

2. The method as claimed in claim 1, wherein the first variable derived from the phase current is an absolute value of the phase current, and wherein the electric machine is switched from the open-circuit mode into the short-circuit mode if the absolute value of the phase current exceeds the first reference value.

3. The method as claimed in claim 1, wherein the second variable derived from the phase current is a frequency of the phase current, and wherein the electric machine is switched from the short-circuit mode into the open-circuit mode if the frequency of the phase current is less than the second reference value.

4. The method as claimed in claim 1, further comprising:
    detecting a further phase current; and
    comparing one of the further phase current or a first variable derived from the further phase current to a further first reference value, wherein switching over of the electric machine from the open-circuit mode into the short-circuit mode is further based on the comparison of the one of the further phase current or the first variable derived from the further phase current to the further first reference value.

5. The method as claimed in claim 4, wherein the further first variable derived from the phase current is an absolute value of the further phase current, and wherein the first further reference value has the same value as the first reference value.

6. The method as claimed in claim 4, further comprising comparing one of the further phase current or a second variable derived from the further phase current to a further second reference value, wherein switching over of the electric machine from the short-circuit mode into the open-circuit mode is further based on the comparison of the one of the further phase current or the second variable derived from the further phase current to a further second reference value.

7. The method as claimed in claim 6, wherein the further second variable derived from the phase current is a frequency of the further phase current, and wherein the further second reference value has the same value as the second reference value.

8. An apparatus controlling an electric machine by means of an inverter, wherein the inverter has a plurality of controllable power switches which are configured to convert a direct voltage of a voltage source, coupled to the plurality of controllable power switches, into an alternating voltage for supplying the electric machine with electrical energy, the apparatus comprising a control unit configured to
switch the electric machine into an open-circuit mode, wherein in the open-circuit mode all of the plurality of controllable power switches of the inverter are opened,
detecting a phase current of the electric machine,
compare one of the phase current or a first variable derived from the phase current to a first reference value,
switch over the electric machine from the open-circuit mode into a short-circuit mode based on the comparison of the one of the phase current or the first variable derived from the phase current to the first reference value, wherein in the short-circuit mode a portion of the plurality of controllable power switches that are assigned to a first potential of the voltage source are closed, and wherein a second portion of the plurality of controllable power switches that are assigned to a second potential of the voltage source are opened,
compare one of the phase current or a second variable derived from the phase current to a second reference value, and
switch over the electric machine from the short-circuit mode into the open-circuit mode based on the comparison of the one of the phase current or the second variable derived from the phase current to the second reference value.

9. A motor vehicle drive train comprising:
an electric machine configured to make available drive power; and
an apparatus for controlling the electric machine, the apparatus including a control unit configured to
switch the electric machine into an open-circuit mode, wherein in the open-circuit mode all of the plurality of controllable power switches of the inverter are opened,
detecting a phase current of the electric machine,
compare one of the phase current or a first variable derived from the phase current to a first reference value,
switch over the electric machine from the open-circuit mode into a short-circuit mode based on the comparison of the one of the phase current or the first variable derived from the phase current to the first reference value, wherein in the short-circuit mode a portion of the plurality of controllable power switches that are assigned to a first potential of the voltage source are closed, and wherein a second portion of the plurality of controllable power switches that are assigned to a second potential of the voltage source are opened,
compare one of the phase current or a second variable derived from the phase current to a second reference value, and
switch over the electric machine from the short-circuit mode into the open-circuit mode based on the comparison of the one of the phase current or the second variable derived from the phase current to the second reference value.

\* \* \* \* \*